United States Patent
Neads

(10) Patent No.: US 10,214,212 B2
(45) Date of Patent: Feb. 26, 2019

(54) PATH CONTROL SYSTEM

(71) Applicant: Anthony Best Dynamics Ltd, Wiltshire (GB)

(72) Inventor: Stephen John Neads, Somerset (GB)

(73) Assignee: Anthony Best Dynamics Ltd, Wiltshire (GB)

( * ) Notice: Subject to any disclaimer, the term of this patent is extended or adjusted under 35 U.S.C. 154(b) by 113 days.

(21) Appl. No.: 15/304,539

(22) PCT Filed: Apr. 16, 2015

(86) PCT No.: PCT/GB2015/051157
§ 371 (c)(1),
(2) Date: Oct. 17, 2016

(87) PCT Pub. No.: WO2015/159091
PCT Pub. Date: Oct. 22, 2015

(65) Prior Publication Data
US 2017/0036675 A1    Feb. 9, 2017

(30) Foreign Application Priority Data

Apr. 17, 2014    (GB) .................................. 1406993.4

(51) Int. Cl.
*G05D 1/00* (2006.01)
*G05D 1/02* (2006.01)
(Continued)

(52) U.S. Cl.
CPC ......... *B60W 30/165* (2013.01); *G05D 1/0295* (2013.01); *B60W 2050/008* (2013.01);
(Continued)

(58) Field of Classification Search
None
See application file for complete search history.

(56) References Cited

U.S. PATENT DOCUMENTS

| 7,869,936 B2* | 1/2011 | Donatelli | ............... | G01C 21/28 340/988 |
| 8,510,029 B2* | 8/2013 | Curtis | .................... | G05D 1/024 340/933 |

(Continued)

FOREIGN PATENT DOCUMENTS

EP    2 237 119 A2    10/2010

OTHER PUBLICATIONS

"Daimler automated driving / ADAS testing promotional video (using by AB Dynamics robots)", May 6, 2010, https://www.youtube.com/watch?v=-1KgivV1ZTI.

(Continued)

*Primary Examiner* — Thomas G Black
*Assistant Examiner* — Demetra R Smith-Stewart
(74) *Attorney, Agent, or Firm* — Bay State IP, LLC

(57) ABSTRACT

A system for controlling from a path of a first vehicle a second vehicle to a complementary path, the system comprising a first vehicle sub-system having a memory for time and (X, Y) position co-ordinates of the first vehicle's path; a GPS receiver for determining time and actual (X, Y) position coordinates of the first vehicle, means for comparing the first vehicle's actual position with path position at determined times as test path errors and means for transmitting the test path errors and a second vehicle sub-system having a memory for time and (X, Y) position coordinates of the second vehicle's path; a GPS receiver for determining time and actual (X, Y) position coordinates of the second vehicle, means for receiving the test path errors, means for computing a modified path of the second vehicle taking account of the test path errors and means for controlling the second vehicle.

18 Claims, 2 Drawing Sheets

(51) Int. Cl.
  *G08G 1/0968* (2006.01)
  *B60W 30/165* (2012.01)
  *B60W 50/00* (2006.01)

(52) U.S. Cl.
  CPC . *B60W 2550/402* (2013.01); *B60W 2550/408* (2013.01); *B60Y 2304/00* (2013.01); *G05D 2201/0213* (2013.01)

(56) References Cited

U.S. PATENT DOCUMENTS

| | | | | |
|---|---|---|---|---|
| 8,874,360 | B2* | 10/2014 | Klinger | G08G 1/162 |
| | | | | 701/22 |
| 9,141,112 | B1* | 9/2015 | Loo | G05D 1/0293 |
| 2013/0017346 | A1 | 1/2013 | Kelly | |
| 2013/0238166 | A1 | 9/2013 | Breu | |
| 2014/0058589 | A1 | 2/2014 | Kelly | |
| 2014/0081505 | A1* | 3/2014 | Klinger | G08G 1/162 |
| | | | | 701/25 |
| 2015/0025713 | A1* | 1/2015 | Klinger | G08G 1/162 |
| | | | | 701/3 |
| 2016/0378111 | A1* | 12/2016 | Lenser | G05D 1/0251 |
| | | | | 701/2 |

OTHER PUBLICATIONS

"ADAS testing using ABD robots and soft crash vehicles", May 14, 2013, https://www.youtube.com/watch?v=StkTeNMXMCs.

* cited by examiner

PATH CONTROL SYSTEM

CROSS REFERENCE TO RELATED APPLICATION

This application is for entry into the U.S. National Phase under § 371 for International Application No. PCT/GB2015/051157 having an international filing date of Apr. 16, 2015, and from which priority is claimed under all applicable sections of Title 35 of the United States Code including, but not limited to, Sections 120, 363, and 365(c), and which in turn claims priority under 35 USC 119 to British Patent Application No. 1406993.4 filed on Apr. 17, 2014.

The present invention relates to a system for controlling, from a path of a first vehicle, a second vehicle to follow a complementary path.

Testing of vehicles, in particular automobiles, can involve controlling them to follow complementary paths which may be close to each other and/or intersect. It is desirable to be able to perform the test with a greater degree of accuracy than is possible with manual control of them.

We have robotically controlled vehicles to follow defined paths independently, by pre-programming controllers with the paths, which are followed independently of each other. Also, in a cut-in test, we have also controlled a second vehicle to follow a set distance in front of a first vehicle along parallel paths.

It is desirable to enable the second vehicle to take account of deviations in the actual path taken by the first, the actual path varying from the programmed path. This was in effect the way in which the cut-in test was operated, with the second vehicle being controlled to keep a fixed distance in front of a first by transmission of position co-ordinates of the first to the second.

The object of the present invention is to provide an improved system for controlling a second vehicle to follow a path complementary to that of a first vehicle.

According to the invention there is provided a system for controlling from a path of a first vehicle a second vehicle to follow a complementary path, the system comprising:
  a first vehicle sub-system having:
    a memory for time and (X,Y) position co-ordinates of the first vehicle's path;
    a GPS receiver for determining time and actual (X,Y) position coordinates of the first vehicle,
    means for comparing the first vehicle's actual position with path position at determined times as test path errors and
    means for transmitting the test path errors and
  a second vehicle sub-system having:
    a memory for time and (X,Y) position co-ordinates of the second vehicle's path;
    a GPS receiver for determining time and actual (X,Y) position coordinates of the second vehicle,
    means for receiving the test path errors,
    means for computing a modified path of the second vehicle taking account of the test path errors and
    means for controlling the second vehicle to follow the modified path, whereby the first vehicle and the second vehicle's travel along actual paths which are complementary to each other in like manner to the memorised paths.

Normally the paths will be expressed as waypoints, each having (X,Y,T) coordinates that is to say the position of the waypoint and the time at which the first vehicle or second vehicle is to be at the waypoint. Intended speed between waypoints can be calculated to a first approximation as the length of the vector between successive waypoints divided by the difference in intended times at them and the angle of the vector gives the heading of the path. We prefer to interpolate a smooth path through the waypoints and calculate intended speed and heading from the interpolated path It can be envisaged that the test path errors could be expressed in terms of errors in the X and Y directions, that is (x,y) at the times T.

However, where the first vehicle is driven robotically or humanly with the aid of road surface markings, it is likely to follow the programmed path with reasonable lateral accuracy, i.e. with relatively small lateral deviations, and slightly larger longitudinal deviations; it is convenient to transmit the errors as time errors and lateral errors. The time errors are the length of time by which the first vehicle is early (or late) at waypoints. Lateral errors are the lateral displacement of the actual path from the programmed path.

Preferably we compute and transmit lateral error as a vector, having the lateral deviation as its magnitude and the angle orthogonal to the intended path as its angle. This enables the correction of the second vehicle's path to be applied in terms of the first vehicle's time error as a change to the second vehicle's intended speed along its intended path, plus a resolved element of the vector in the direction of the path, together with a resolved element of the vector laterally of the path. In tests involving parallel driving, such as over-taking or approaching, the full magnitude of the vector is used as the lateral element. It is the same amount by which both paths are laterally displaced. This has particular advantage in enabling close manoeuvring of the vehicles in such tests with the first vehicle under human and/or cruise control.

Also since speed is readily available and a positive speed error gives an indication of the need for an increase in the second vehicle's speed and vice versa, speed errors are also transmitted. This can be as an actual error in speed dimensions or as a percentage error in speed.

Further, whilst errors can be transmitted for each waypoint, they are conveniently transmitted at regular time intervals, which are more frequent than the intervals between passing waypoints. This more frequent transmission is facilitated by interpolation of the intended path between the waypoints. Waypoints are normally specified at fixed separations along the intended path. The separations between waypoints are unlikely to be less than 2 meters, which is normally less than the length of either vehicle. However, the separations can be smaller for slow speed tests. Waypoints need not be set at fixed separations and could be set as regular time intervals along the intended paths.

To help understanding of the invention, a specific embodiment thereof will now be described by way of example and with reference to the accompanying drawings, in which.

Figure 1:
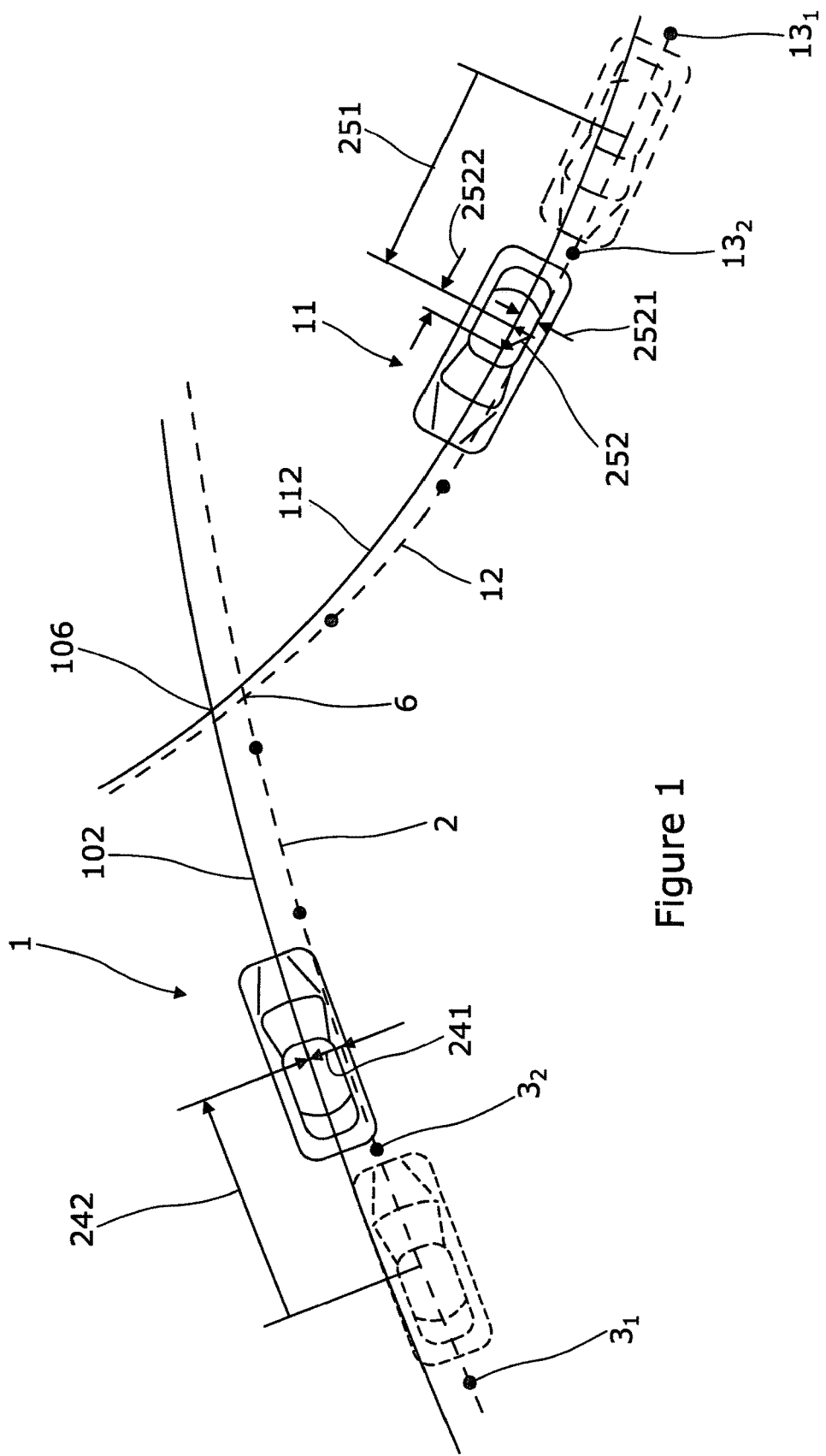
FIG. 1 is a plan diagram of a first and second vehicles' intended and actual paths during a test using a control system in accordance with the invention.
Figure 2:
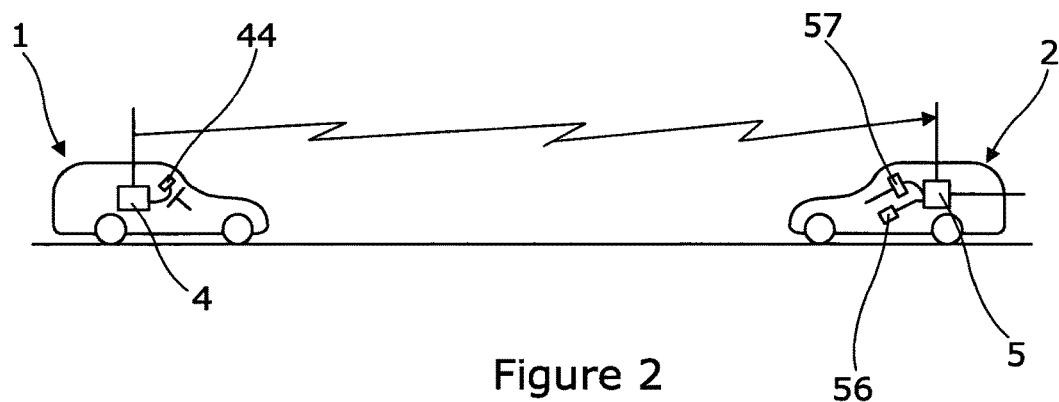
FIG. 2 is a diagrammatic side view of the two vehicles during the test.
Figure 3:
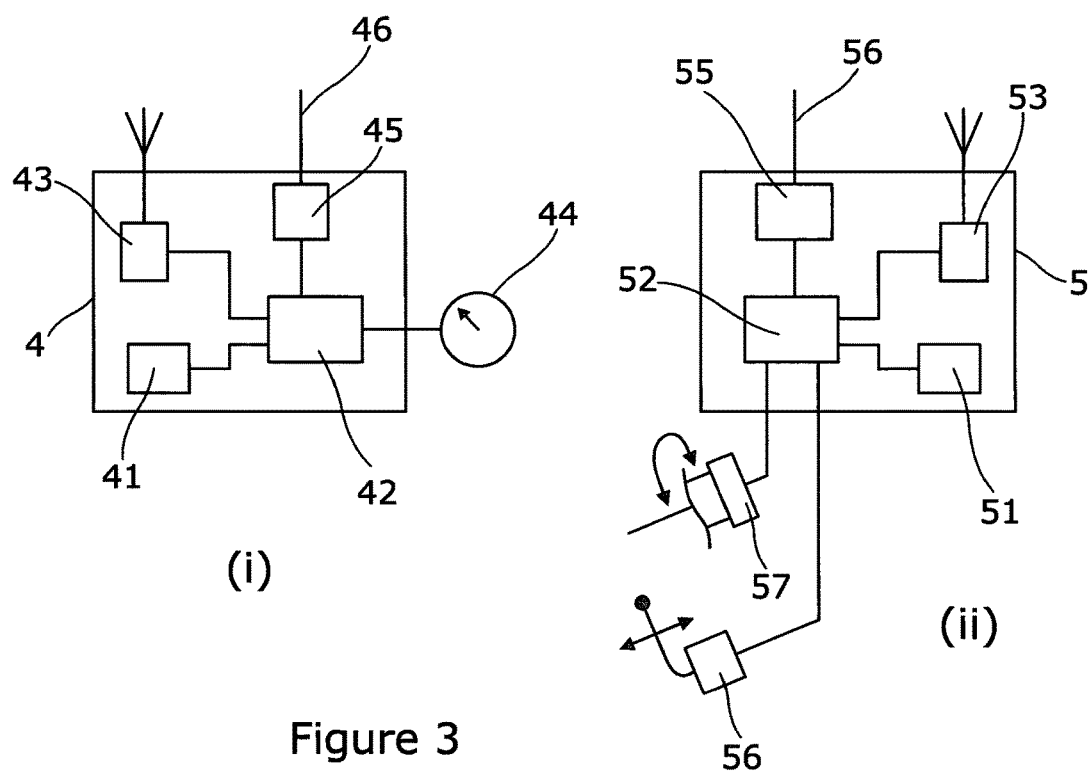
FIG. 3 is a block diagram of the control system showing the first vehicle's sub-system at (i.) and the second vehicle's sub-system at (ii.).

Referring to the drawings, a typical accident avoidance apparatus test involves driving a first, "test" or "subject" vehicle 1 along a first intended and predetermined path 2, defined by way points $3_1, 3_2 \ldots 3_n$. This driving may be under human control, robotic control or cruise control for instance. A second, "target" or "control" vehicle 11 is to be driven along a second predetermined path 12, again defined by way points 13₁, 13₂ ... 13ₙ. The paths are intended to and do intersect at an intersection point where or close to which the accident avoidance apparatus takes over control from the system of the invention. Taking over control and events thereafter form no part of the present invention.

The first vehicle will normally be a conventional automobile. The second vehicle can be a conventional automobile with robotic devices controlling speed, steering and braking. Alternatively it can be a self-propelled carrier for a soft crash dummy automobile. Again the exact nature of the vehicles forms no part of the invention.

The first vehicle is equipped with a first sub-system 4 of a control system of the invention. Within the first sub-system is a memory 41, able to be programmed with the waypoints defining the first path 2 intended to be driven by the first vehicle in the test. Typically the waypoints are separated by 2 meters. Associated with the memory is a processor 42 for interpolating a smooth path through the waypoints. This is the path 2 which the sub-system works with. Also included is a GPS module 43. This is capable of measuring the first vehicle's position to within 10 cm or better. Typically it does this at 100 Hz. The GPS module is connected to the processor and the latter is programmed to compare actual position to intended position synchronously with the GPS module ; i.e. 100 comparisons between intended and actual positions are made per second.

Where the test is such that the vehicle is travelling at urban speed of say 45 kph (28 mph) with waypoints set at 2 m intervals along the intended path and comparisons being made at 100 Hz, they are at 0.125 m intervals, i.e. sixteen times as frequently as the waypoints are passed. The intervals vary with speed.

Insofar as tests are conveniently planned in terms of distance travelled along a path, which can be straight or curved and at any angle to a path of a second vehicle described below, the waypoints are generally determined as X,Y,T co-ordinates along the path, at fixed distances/separations. The comparisons are more frequent than the waypoints and the intended path can be curved as interpolated. The comparison times will seldom coincide with an intended time at a way point. The processor is programmed to calculate the positions along the intended path that would have been reached at the comparison times in the absence of accumulated driving errors. It is these positions that are used with the actual GPS determined positions in computing path errors to be sent to the second vehicle.

Normally the GPS rate is faster than can be sent to the second vehicle and the rate at which error signals are transmitted as below is slower, typically 50 Hz.

The comparisons and error signals for lateral deviation 241 from the intended path are likely to be at low numbers of units of GPS resolution, i.e. low numbers of tens of centimeters, because a human driver's steering or a robotic steering is likely to be accurate—c.f. a human driver's ability to follow traffic lanes. However the comparisons and error signals for longitudinal deviation 242 along the intended path are likely to tens of meters, i.e. two orders of magnitude greater than for lateral deviation. This is because the driver lacks convenient terms of reference in judging accurate progress along the intended path at urban speed. In other words, a driver—with road markings to follow—or cruise control with robotic steering can keep laterally close to an intended path but not longitudinally close as regards time at waypoints. Also provided that the driver is made aware of an intended speed, suitably by a display 44, he/she can keep close to this.

The actual path 102 followed by the first vehicle is shown in FIG. 1.

Accordingly the processor is conveniently programmed to generate:
- lateral error signals as lateral deviations from the intended path and
- longitudinal error signals as longitudinal deviations along the intended path. Since the intended speed is likely to be closely followed by the driver or cruise control, the longitudinal error signal is conveniently generated as a length of time by which the first vehicle is early along its intended path (or negative time by which it is late).

Speed errors in terms of difference in magnitudes of vectors tangential to the actual path and intended path are readily computed. Conveniently speed errors are generated as a percentage by which actual speed exceeds intended speed, with a negative percentage where the first vehicle is too slow.

These three errors, lateral, longitudinal and speed together with their time of comparison are transmitted via a transmitter 45 with an aerial 46.

The second vehicle is equipped with a second sub-system 5 of a control system of the invention. As with the first sub-system, within the second sub-system is a memory 51, able to be programmed with the waypoints defining the second path 12 intended to be followed by the second vehicle in the test. Again, typically the waypoints are separated by 2 meters. Again, associated with the memory is a processor 52 for interpolating a smooth path through the waypoints. This is the path 12 which the sub-system works with. Also included is a GPS module 53. This is capable of measuring the vehicle, position to within 10 cm or better. The GPS module is connected to the processor. Also included is a receiver 55 with an aerial 56.

Via the GPS unit and the programming of the processor, the second sub-system identifies the actual position of the second vehicle with respect to its intended path. Via the receiver and the received error representing the deviation of the first vehicle from its course, the processor computes where the second vehicle should be and the vector of its velocity that it should have on a modified path 112 in order to meet the first vehicle, or at least for their paths to cross at an intended point 6 and actual point 106, in the manner intended by their intended paths, whereby for instance accident avoidance equipment in the first vehicle can control it to avoid impact with the second vehicle. The second path is pre-determined so that the vehicle approach to the meeting/crossing point is co-ordinated in a manner appropriate for the test to be carried out.

The second vehicle is robotically controlled, that is to say its engine and its steering are controlled via servo motors 56,57 to cause it to be at complementary lateral and longitudinal displacements 251,252 in real time from its intended course on a modified path.

Insofar as the longitudinal deviations are typically two orders of magnitude greater than the lateral deviations, correction of the second vehicle's progress along its modified path 112 in terms of its timing along the path, in other words application of the timing error as an actual time interval, will cause the vehicles to approach in a manner that is nearly good enough—or may in fact be actually good enough—for some tests. However in intersecting tests, lateral deviation of the first vehicle causes it to approach the second vehicle at a different position longitudinally of the car with respect to the intended paths. To correct this, the vector of lateral deviation of the first vehicle is added to the speed/time corrected longitudinal deviation of the second vehicle. In other words, if there is no lateral deviation, the vehicles will travel along their intended paths and reach the intersection point 6, being together or one before the other as intended, in the intended manner, but simply at a different instant in time. With a lateral deviation of the first vehicle, the same vector quantity of the deviation must be added to the actual position of the second vehicle. With the intended paths not parallel, this vector has components in the direction of the second vehicle's intended path and orthogonal to it. These components 2521, 2522 are added to the correction 251 of the second vehicle, be it expressed in time at speed or in distance, along its path.

With the intended paths parallel, it is the magnitude of the vector that is used directly to modify the path of the second vehicle. This enables accurate and responsive control of the lateral position of the second vehicle, enabling passing tests (overtaking or approaching) to be performed consistently and with confidence.

A test is started when the first vehicle is started. The second vehicle is then started in step. For some tests, the second vehicle can be programmed to start after the first vehicle, as in simulation of a vehicle pulling unexpectedly into the path of the first. Where the first vehicle already has a time error along its path, this is taken into account in the start time of the second vehicle.

Whilst the first vehicle's errors accumulate from the start of the test throughout its course, the increments in the errors between transmissions and the complementary increments in the displacements from the second vehicle's intended path are small and can be adjusted for by small changes in the servo control signals to the servo motors compared to the signals for following the intended path, at least as regards the speed servo motor is concerned.

What is claimed is:

1. A system for controlling from a path of a first vehicle a second vehicle to follow a complementary path, the system comprising:
    a first vehicle sub-system having:
        a memory for time (T) and (X,Y) position co-ordinates of the first vehicle's path;
        a GPS receiver for determining time (T) and actual (X,Y) position co-ordinates of the first vehicle,
        means for comparing the first vehicle's actual position with path position at determined times as test path errors and
        means for transmitting the test path errors and
    a second vehicle sub-system having:
        a memory for time (T) and (X,Y) position co-ordinates of the second vehicle's path;
        a GPS receiver for determining time (T) and actual (X,Y) position co-ordinates of the second vehicle,
        means for receiving the test path errors and
        means for computing a modified path of the second vehicle taking account of the test path errors and generating control signals for controlling the second vehicle to follow the modified path, whereby the first vehicle and the second vehicle's travel along actual paths which are complementary to each other in like manner to the memorised paths;
    wherein the memories of the first and second vehicle sub-systems are adapted to memorise the respective paths as waypoints, each having (X,Y,T) co-ordinates.

2. A system as claimed in claim 1, including means for controlling the second vehicle to follow the modified path in accordance with the control signals.

3. A system as claimed in claim 1, wherein the first and second vehicle sub-systems are adapted to calculate:
    intended speed between waypoints to a first approximation as the length of the vector between successive waypoints divided by the difference in intended times at them and
    intended path heading as the angle of the vector.

4. A system as claimed in claim 1, wherein the first and second vehicle sub-systems are further adapted to interpolate a smooth path through the waypoints and calculate intended speed and heading from the interpolated path.

5. A system as claimed in claim 1, wherein the first and second vehicle sub-systems are adapted to express test path errors, and respectively transmit and receive them, in terms of errors in the X and Y directions, that is (x,y) at the times T.

6. A system as claimed in claim 1, wherein the first and second vehicle sub-systems are further adapted to express test path errors as time errors and lateral errors:
    the time errors being the length of time by which the first vehicle is early (or late) at waypoints and
    the lateral errors being the lateral displacement of the actual path from a memorised, waypoint path.

7. A system as claimed in claim 6, wherein the first and second vehicle sub-systems are further adapted to compute and transmit lateral error as a vector, having the lateral deviation as its magnitude and the angle orthogonal to the intended path as its angle.

8. A system as claimed in claim 7, wherein the first and second vehicle sub-systems are further adapted to modify the second vehicle's path in terms of the first vehicle's time error as a change to the second vehicle's intended speed along its intended path, plus a resolved element of the vector in the direction of the path, together with a resolved element of the vector laterally of the path.

9. A system as claimed in claim 1, wherein the first and second vehicle sub-systems are adapted additionally to transmit and receive respectively an error in the speed of the first vehicle.

10. A system as claimed in claim 1, wherein the first and second vehicle sub-systems are adapted to transmit and receive errors at regular time intervals.

11. A method of controlling a second vehicle to follow a path complementary to that of a first vehicle, the vehicles being equipped with respective first and second vehicle sub-systems as claimed in claim 1, the method consisting in the steps of:
    memorising the first and second vehicles' intended paths,
    determining the first vehicle's actual position and comparing it with its intended position periodically to generate test path errors,
    transmitting the test path errors from the first vehicle to the second vehicle and
    computing a modified path for the second vehicle and controlling the second vehicle to follow the modified path.

12. A method as claimed in claim 11, including:
    memorising the paths as way points and
    calculating:
        intended speed between waypoints to a first approximation as the length of the vector between successive waypoints divided by the difference in intended times at them and
        intended path heading as the angle of the vector.

13. A method as claimed in claim 11, including expressing test path errors, and respectively transmitting and receiving them, in terms of errors in the X and Y directions, that is (x,y) at the times T.

14. A method as claimed in claim 11, including expressing test path errors as time errors and lateral errors:
  the time errors being the length of time by which the first vehicle is early (or late) at waypoints and
  the lateral errors being the lateral displacement of the actual path from a memorised, waypoint path.

15. A method as claimed in claim 14, including computing and transmitting lateral error as a vector, having the lateral deviation as its magnitude and the angle orthogonal to the intended path as its angle.

16. A method as claimed in claim 15, including modifying the second vehicle's path in terms of the first vehicle's time error as a change to the second vehicle's intended speed along its intended path, plus a resolved element of the vector in the direction of the path, together with a resolved element of the vector laterally of the path.

17. A method as claimed in claim 11, including additionally transmitting and receiving respectively an error in the speed of the first vehicle.

18. A method as claimed in claim 11, including transmitting and receiving errors at regular time intervals by interpolation of the intended path between waypoints.

\* \* \* \* \*